United States Patent [19]

Wurster

[11] 4,377,977
[45] Mar. 29, 1983

[54] CONCRETE SECURITY STRUCTURES AND METHOD FOR MAKING SAME

[75] Inventor: Harry J. Wurster, Centerville, Ohio

[73] Assignee: The Mosler Safe Company, Hamilton, Ohio

[21] Appl. No.: 191,418

[22] Filed: Sep. 29, 1980

Related U.S. Application Data

[63] Continuation of Ser. No. 697,222, Jun. 17, 1976, abandoned, which is a continuation of Ser. No. 500,707, Aug. 26, 1974, abandoned.

[51] Int. Cl.³ .............................................. E05G 1/024
[52] U.S. Cl. ..................................................... 109/83
[58] Field of Search ...................... 109/80, 82, 83, 84; 106/89, 98, 99; 264/31, 35, 228

[56] References Cited

U.S. PATENT DOCUMENTS 1,688,849 10/1928 Bellamore et al. .
3,429,094 2/1969 Romualdi .
3,861,929 1/1975 Deets et al. .

Primary Examiner—David H. Corbin
Attorney, Agent, or Firm—Wood, Herron & Evans

[57] ABSTRACT

A concrete security structure such as a money safe, vault, or the like, is provided with unique burglar-proof qualities. The security structure includes a hardened concrete composition which possesses torch or high temperature resistance without flaking, spalling or exploding, and superior resistance to attack by means of burglary tools such as hammers, chisels, drills, cutting implements or the like. The security concrete is derived from a moldable uniform mixture which comprises granular temperature resistant aggregates, reinforcing filaments, an expansive cement and water. A method for making safes or vaults is provided by supplying a castable aqueous mixture of ingredients into a metallic shell, casing or mold and permitting the mixture to cure.

11 Claims, 2 Drawing Figures

CONCRETE SECURITY STRUCTURES AND METHOD FOR MAKING SAME

This is a continuation, of application Ser. No. 697,222, filed June 17, 1976, now abandoned, which in turn is a continuation of application Ser. No. 500,707, filed on Aug. 26, 1974, now abandoned.

BACKGROUND OF THE INVENTION

Safes or vaults which employ concrete, heat insulating or filler materials in their wall structures are well known. Prior art patents representative of such security structures embodying filler materials include U.S. Pat. Nos. Re. 15,429; U.S. Pat. Nos. 1,400,104; 1,443,087; 2,134,861 and 2,492,422. A number of problems have been associated with concrete structures and methods of making them. For example, prior art concrete structures usually have a thick outer metal wall and a lighter inner wall between which a concrete mass has been poured and hardened. Concrete is a mixture of a binding paste and aggregate. The paste is mainly composed of cement and water. To make a concrete mass pourable or workable, there is an excess of water required. The water over and above that required to complete the chemical hydration or setting reaction is called "water of convenience" or "free water." This free water usually remains in varying amounts within the cement structure and presents a number of problems peculiar to the manufacture and use of security cement structures. First, such free water subjects the walls of a safe to liability of corrosion. Furthermore, it has been reported that free water sometimes causes sweating which is detrimental to the contents of the safe. Also, undesirable loss of concrete strength usually accompanies the presence of free water. In the cement curing process, furthermore, the free water will bleed within the concrete and emerge from the concrete surfaces. Bleeding water must be removed during manufacture and hinders efficiency. In addition, it is nearly impossible to determine the exact percentages of free water in the concrete mass without breaking down the structure of the safe; and as the free water remains in the concrete mass during a period of years, shrinkage usually takes place resulting in the cracking of the concrete mass. Therefore, avenues are open for the burglar to penetrate the weakened concrete mass. Shrinkage also occurs during the curing process of ordinary or standard concrete compositions and this causes the cement to shrink away from the internal walls or casing of the safe structure. Such shrinkage prevents a form-fitting composite and facilitates entry by various burglar means.

Additionally, a major disadvantage associated with known concrete safe liners or walls has been their unsatisfactory resistance to attack by acetylene torch or high temperature means. Upon exposure of known concrete masses to an acetylene torch, such masses tend to spall, disintegrate, or even explode. Spalling or disintegration of the concrete by torch renders the concrete very susceptible to subsequent penetration by chisel, hammer, drill or other tools. Even without torch penetration, known concrete structures are not satisfactorily burglar-proof. In short, improvements are needed.

SUMMARY OF THE INVENTION

This invention is directed to novel security concrete structures which have a number of advantageous features. Safes or vaults made in accordance with the principles of this invention are exceedingly resistant to attack by torch, tool or other means often employed by a burglar. This invention also provides a unique method for making security concrete bodies or composites which overcome many of the deficiencies associated with prior art techniques.

In one of its aspects, this invention pertains to a novel security concrete composition which has been found especially suitable for use in the formation of safe liners or wall structures. The composition of this invention is derived from a moldable mixture of granular temperature resistant aggregates, reinforcing filaments, an expansive cement and water. The expansive cement is preferably shrinkage-compensating and self-stressing. Such moldable aqueous mixtures have been formulated to provide a slump or consistency which permits them to be worked and free flowing in the manufacture of security door and wall structures according to this invention. Furthermore, this invention is predicated in part upon the recognition that free water in known concrete safe bodies contributes to disintegration, spalling or explosion of the concrete upon exposure to high temperatures of an acetylene torch. However, by the employment of the security concrete compositions and structures of this invention, torch spalling, disintegration and explosion phenomena have been eliminated.

This invention contemplates the use of an expansive cement as the hydraulic binder for the security concrete mass. An expansive cement for use in this invention is preferably shrinkage-compensating as well as self-stressing. It has been empirically demonstrated that certain concrete compositions composed of temperature resistant or refractory aggregates, reinforcing filaments, expansive shrinkage-compensating cements and water can be formulated to the necessary consistency for making the mixture workable and suitable for use in a manufacture of strong concrete bodies and composite concrete bodies for security structures. In contrast, when prior art concrete compositions have been made with comparable workable slumps, the cement structure formed is weak, bleeds excessively and has the disadvantages mentioned in the background of this invention. In contradistinction, even though moldable mixtures of this invention have high slumps due to the presence of large amounts of water, the security concrete compositions enter into chemical reactions where such water becomes chemically bound in the matrix or exists in such form which does not cause spalling, disintegration or explosion of the set concrete mass. The precise reasoning or theory for such results is not completely understood. Nevertheless, the advantages of this invention have been demonstrated. Other unique advantages are also achieved. For example, known standard security concrete will shrink as it dries, as mentioned above, and this shrinkage is conducive to concrete cracking even in the presence of reinforcing steel. However, the compositions of this invention eliminate such stress cracking and, furthermore, permit the moldable ingredients to be poured into a safe steel casing without separation from the walls of the casing. Bleeding water is not only eliminated, which facilitates production techniques for the inventive security structures, but even though a high slump is used, the mixing water is apparently consumed at a very rapid rate in the early hydration process. Further, excess mixing water does not deleteriously affect the concrete produced.

In another of its aspects, this invention provides a security concrete having self-stressed reinforcing filaments. Self-stressed concrete has been found to produce security structures of considerable compressive strength and resistance to attack by burglar means. For example, the security concrete is virtually impenetrable to hammer or sledge attack. The self-stressed concrete and fibers are considered to synergistically preform in the cement matrix of this invention to achieve this result. Moreover, workable slumps are achievable even with the reinforcing fibers in the cement paste-aggregate mixture.

The granular temperature resistant or refractory aggregate is an essential component of the security concrete composition. This aggregate provides several important properties, including impact resistance, hardness to prevent fracturing and abrasion resistance. Furthermore, the aggregate should preferably contribute to processing reproducibility. The presently preferred granular temperature resistant aggregate is silica sand. An example is standard 20-30 Ottawa sand (ASTM C-190) having a U.S sieve analysis of no more than about 15% remaining on a 20 mesh screen and no more than about 5% passing a 30 mesh screen. This silica sand has the characteristics required to provide the density, hardness, abrasion resistance, impact strength and is of substantially pure $SiO_2$ which performs in the preferred manner according to the principles of this invention. Of course, other types of silica sand may be employed. The term "silica sand" is applied to sand composed almost exclusively of grains of the mineral quartz ($SiO_2$). Commonly, such sands contain more than about 95% $SiO_2$ and certain of them more than 99% $SiO_2$. Another significant reason for the use of the silica sand aggregate in a preferred embodiment of this invention is its substantially non-moisture sorptive character. It is preferred that an aggregate be selected which has the property of non-moisture sorptivity in order to reduce the likelihood of free water becoming trapped or embodied in the internal structure of the aggregate material and hence the cement. As developed above, moisture trapped in the concrete or in the internal aggregate structure can lead to concrete disintegration upon exposure to torch temperatures. Silica sand has been found to neither absorb water from or contribute water to the concrete mix and, therefore, avoids the entrapment of moisture. Other aggregates of course would perform this function and, therefore, other sands can be employed alone or in combination with other non-sorptive aggregates such as granite, or, ferrosilicon, quartz, and the like, can be employed. Furthermore, while the silica sand preferred is a fine aggregate, other coarser materials may be used alone or in combination with the finer aggregates without departing from the scope of this invention. Fine aggregate as used herein means (1) aggregate passing the ⅜ in. (9.5 mm) sieve and almost entirely passing the No. 4 (4.76 mm) sieve and predominantly retained on the No. 200 (74 micron) sieve; or (2) that portion of an aggregate passing the No. 4 (4.76 mm) sieve and predominantly retained on the No. 200 (74 micron) sieve. Coarse aggregate means aggregate predominantly retained on the No. 4 (4.76 mm) sieve; or that portion of an aggregate retained on the No. 4 (4.76 mm) sieve.

The reinforcing filaments suitable for use according to this invention are the type which provide flexible strength and tensile strength to the security concrete mass. Furthermore, as mentioned above, the reinforcing filaments in combination with the expansive hydraulic binder will bring about a self-stressing of the concrete to produce a security structure which is exceedingly strong and has high compressive strengths on the order of about 8000 to 11,000 psi. It is preferred to use metallic filaments as the reinforcing elements in the security concrete mass because they provide sufficient internal stressing to achieve the compressive strengths, flexibility and tensile strengths of the concrete mass. Furthermore, it has been found that the use of such metal filaments in the concrete mass upon the action of an acetylene torch will deposit on the tip of the torch and tend to destroy the torch tip. The preferred type of metal reinforcing filaments are fully described in U.S. Pat. No. 3,429,094. The disclosure of this patent pertaining of fine steel wires preferred for use in accordance with the principles of this invention is incorporated herein by reference. Particularly, the steel wires preferably are substantially straight and may vary in length from on the order of about ½ inch to about 1½ inch and have diameters of at most about 0.3 inch, preferably from about 0.006 inch to about 0.0625. The ratio of length to diameter of the wire is from about 40 to about 120 and the wire preferably has a modulus elasticity within the range of about 27 to 32 million psi. These wires may be slightly crimped to enhance their binding effect in the concrete mass. Of course, other metallic filaments as the reinforcing filament element in the security concrete may be employed. Also, the filaments may be round, flat, or the like. For example, various types of metals and metal alloy filaments can be substituted, including boron, carbon, steel, copper alloys, and the like. Furthermore, such metal fibers may be coated to resist corrosion. As mentioned, it has been found that the moldable mixture of temperature resistant aggregate, steel fibers and expansive hydraulic binder permits the inclusion of an amount of water which enables the concrete composition to be mixed and worked in production techniques.

The expansive cement component cooperates with the other essential ingredients of the moldable composition to achieve the advantageous concrete of this invention. Such expansive cements are well known. A comprehensive report on such cements was issued by the American Concrete Institute Committee 223, entitled *Expansive Cement Concretes,* Publication SP-38, 1973, (Library of Congress Catalog Card No. 73-77948). An especially preferred expansible shrinkage-compensating binder is known as Type K cement as classified by the ACI Committee 116 on nomenclature, Publication SP-19, (Library of Congress Catalog Card. No. 67-30095). A commercial product suitable for use in this invention is sold under the trademark ChemComp by Southwestern Portland Cement Co. This expansive shrinkage-compensating binder or cement is fully disclosed in U.S. Pat. Nos. 3,155,526 and 3,251,701 and such disclosure in these patents is incorporated herein by reference. Basically, such an expansive binder contains an ordinary portland cement component and an expansive component. The expansive component in ChemComp consists for the most part of stable calcium sulfoaluminate $(CaO)_4(Al_2O_3)_3SO_3$ in the form of a ternary system or complex with extractable associated lime (CaO) and extractable associated anhydrous calcium sulfate ($CaSO_4$), the extractable lime being determined by the method of ASTM C114-58 and associated anhydrous calcium sulfate being determined by the method of Forsen as modified by Manabe and published in A.C.I. Journal, vol. 31, No. 7, January 1960 under the title "Determination of Calcium Sulfoaluminate in Cement Paste by Tracer Technique". The more specific details of these compositions are included at Column 1 of U.S. Pat. No. 3,251,701, particularly at lines 19-55, and at Column 3, line 26 through Column 9. Therefore, an especially preferred expandable shrinkage-compensating hydraulic cement in accordance with the principles of this invention includes a major amount of a portland cement and a minor amount of an expansive component in an amount at least sufficient to compensate for the shrinkage of the portland cement and to impart expansive properties when the expansive component is hydrated.

More generally, expansive concretes are usually divided into two categories, shrinkage-compensating and self-stressing. American Concrete Institute defines shrinkage-compensating concrete as an expansive cement concrete in which expansion if restrained induces compressive stresses which approximately offset tensile stresses in the concrete induced by drying. Self-stressing concrete is an expansive cement concrete in which expansion, if restrained, induces compressive stresses of a high enough magnitude to result in significant compression in the concrete after drying shrinkage (and creep) has occurred. The compressive stresses induced by shrinkage-compensating cements in concrete are about 25 to 100 psi (2 to 7 kg/cm$^2$), and by self-stressing cements above about 100 to about 1000 psi (7 to 70 kg/cm$_2$). Expansive cements consist predominantly of portland cements, about 90 to 70 percent, with, however, an expansive component in a minor or remainder amount to provide shrinkage-compensating and self-stressing properties. The American Concrete Institute has defined three types of shrinkage-compensating cements, Type K, S and M-X (or M). The three types of shrinkage-compensating cements are characterized by different alumina-bearing agents, $C_4A_3\bar{S}$ in Type K, $CA+C_{12}A_7$ (calcium aluminate cement) in Type M-X, and $C_3A$ in Type S. The sulfate is present as gypsum, hemihydrate, anhydrite and, in part in Type K cement, as $C_4A_3\bar{S}$. There remains little doubt that ettringite formation is the source of expansive energy according to the reaction, $6C+A+3\bar{S}+32H\rightarrow C_3A.3C\bar{S}.H_{32}$. The above abbreviations for oxides are, $CaO=C$, $SiO_2=S$, $Al_2O_3=A$, $Fe_2O_3=F$, $SO_3=\bar{S}$, and $H_2O=H$. No one of the oxides actually occurs as a reactant except water in part. Phase rule dictates expression of the reactants as oxides in a general reaction. The practical application of expansive cement is based on controlling the kinetics and extent of the ettringite formation reaction. Ettringite starts forming the instant water comes into contact with the cement grains.

The Type K cement is presently preferred in this invention because the expansive agent of anhydrous calcium sulfoaluminate uniformly controls the ettringite formation in the cement composition. It is theorized that the precipitation of ettringite is forced into the voids of the cement paste and contributes to reducing permeability and moisture sorptivity. Formation of this compound is accompanied by a large increase in volume and is the basic mechanism of expansive cements. These cements consist essentially of portland cements containing from about 10 to 30 percent of expansive constituents. The expansive ingredient is usually proportioned by the producer to provide enough CaO, SO$_3$, and Al$_2$O$_3$ needed for the desired amount of ettringite formation. Ettringite starts to form as soon as water is added to the cement during mixing and continues to form during the subsequent curing period until the SO$_3$ or Al$_2$O$_3$ is exhausted. It is essential that the major part of ettringite formation take place after the cement has gained some strength, otherwise the expansion would only deform the still plastic concrete without developing the desired compressive stress in the restrained concrete. In expansive cements, two hydration reactions are involved, namely, the formation of the strength-giving calcium silicate hydrates and the formation of the expansion-causing compound ettringite which requires additional water of hydration. The results of this invention are considered surprising since it is believed that the colloidal nature of ettringite has a tendency to hold large amounts of water. Such water has been found undesirable in prior art cements. Also, water has been discovered according to this invention to contribute to spalling and disintegration. Therefore, quite unexpectedly, the security concrete structures of this invention do not spall, disintegrate or explode in spite of this tendency of ettringite. Therefore, a large amount of water may be added to the moldable mixture which facilitates processing and production of the security safe structures of this invention. Slumps on the order of about 5.5 to about 6.5 inches are capable of being used, well above the permissible slumps with ordinary portland cement without weakening the concrete structure in a cured state. The hydratable expansive cements take up the excess water of the mix by reacting therewith to form a hydrated binder system. Unlike ordinary cement which has been used heretofore in security compositions which require an excess of water which remains in the concrete to provide the disadvantageous effects discussed above, the additional water necessary for the expansible component is either used up or contained in the setting process. Furthermore, by the use of such expansible cement binder, compressive strengths on the order of about 9000 to about 11,000 psi are achievable in the security compositions of this invention and such strengths provide a virtually impenetrable barrier for hammers and impact tools of a burglar. As the security concrete sets, the expansible cement binder bonds to the steel fibers and at the same time the expansive reaction causes a volumetric expansion of the concrete. Since the concrete is bonded to the steel fibers, in this respect expansion will put the fibers in tension and concrete in compression. The concrete is precompressed, but at a level of magnitude much less than that of conventional pre-stressing. The expansive reaction is complete in the first few days of concrete curing. Later, when the concrete is exposed to drying conditions, it will shrink just as standard portland cement concrete. But unlike standard portland cement concrete, the shrinkage simply relieves the slight precompression and does not build up tensile stresses.

The proportions of the components in the security concrete compositions of this invention will vary. However, the following broad range of tolerances on a parts by weight basis are suitable:

| | |
|---|---|
| Sand | about 120 to 190 parts |
| Expansible Cement | about 80 to 175 parts |
| Steel Fibers | about 40 to 65 parts |
| Water | about 30 to 75 parts |

The above components are used in the examples which follow by mixing in a barrel type mixer with paddles. The dry materials may be added in succession to the mixer as the mixer operates. The dry materials are mixed for several minutes and then water is added incrementally in 20% steps, with a few minutes of running in the mixer between each addition. After all the materials have been added, the mixer is operated for an additional several minutes. At this point the slump is measured by the ASTM technique (ASTM C 143-39). When the slump is within the range of about 5.5–6.5 inches, the moldable mixture of ingredients is cast into place with sufficient vibration to assure filling to the safe cavity, i.e., door, wall or the like.

These and other objectives of this invention will be further understood by reference to the drawing and the following examples in which.

Figure 1:
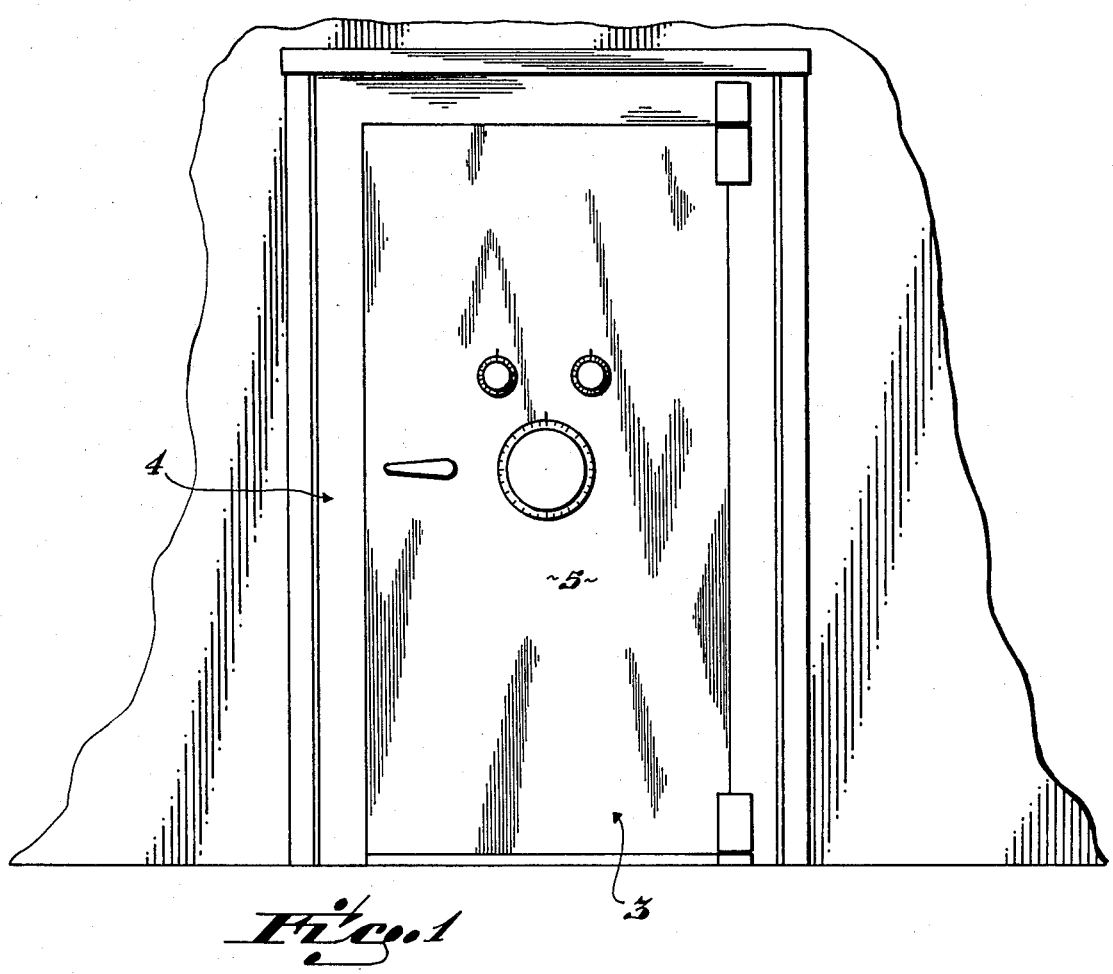
FIG. 1 is a front view of a safe.
Figure 2:
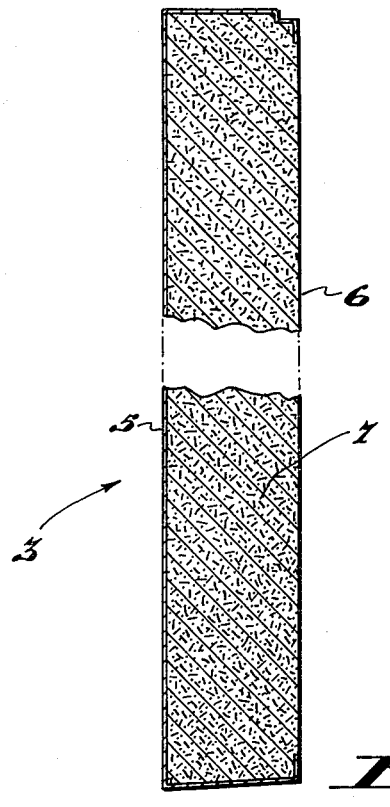
FIG. 2 is a vertical cross section of the safe door filled with the security concrete composition of this invention.

The door 3 of FIG. 1 is mounted in the opening of the safe 4 by suitable means not shown. The front face 5 of the door is made of 12 gauge stainless steel and the rear face 6 in this illustration is exposed security concrete 7. The cross section in FIG. 2 does not illustrate the other internal components of the safe door, however, it is to be understood that the moldable aqueous mixtures have a slump which facilitates their vibration into cavities and interstices formed by such components to provide a form-fitting composite mass therewith. The stainless steel face 5, after bending in the suitable shape, forms a container or cavity for the security concrete. The safe has remaining walls not shown in detail which may also be formed by the security composition of this invention or in composite form with steel casings or other supporting materials. Of course, it is to be appreciated that the safe shown in the drawing is merely illustrative of the principles of this invention and other security structures may be constructed to achieve the results afforded by this invention.

EXAMPLES 1–8

Employing the general mixing procedure referred to above, silica sand, expansive cement Type K (Chem-Comp referred to above), ¾ inch steel fibers having about 0.016 inch diameter, water with or without other materials were mixed and cast into place with sufficient vibration to insure the filling of a mold cavity. The metal door 3 of FIG. 1 may form the cavity. Table I demonstrates the amounts and kinds of various materials included in the Examples.

TABLE I

| | | | | Materials | | | | | |
|---|---|---|---|---|---|---|---|---|---|
| Example | Silica Sand ASTM C-190 | Chem Comp Cement | Steel Fibers | Expanded Metal | Granite Chips | Re-Bars ½" | Latex Binder | Glass Fibers | Water Pounds |
| 1 | 190 | 175 | 65 | — | — | — | — | — | 40 |
| 2 | 190 | 175 | 65 | Yes | — | — | — | — | 40 |
| 3 | 190 | 125 | 65 | — | — | — | — | — | 35 |
| 4 | 70 | 175 | 65 | — | 130 | — | — | — | 40 |
| 5 | 190 | 175 | 65 | — | — | Yes | — | — | 40 |
| 6 | 190 | 175 | — | — | — | — | 32 | 6 | 40 |
| 7 | 190 | 175 | 65 | Yes | — | — | — | — | 40 |
| 8 | 70 | 175 | 65 | — | 130 | Yes | — | — | 40 |

The amounts of materials are indicated in pounds and, in certain Examples, expanded metal, granite chips, reinforcing bars (Re-Bars) and latex binder-glass fibers were used. The use of latex binder and glass fibers were employed to increase impact resistance. The concrete Examples were cured at ambient conditions and no evidence of bleeding water was observed. After passage of time, the compressive strengths of Examples 1–8 were measured at 7 days, 14 days and 28 days after casting.

TABLE II

| | COMPRESSIVE STRENGTHS | | |
|---|---|---|---|
| Example | 7 Days | 14 Days | 28 Days |
| 1 | 6980 | 7355 | 9085 |
| 2 | 6990 | 7778 | 9196 |
| 3 | 6960 | 8062 | 8301 |
| 4 | 5970 | 6506 | 8203 |
| 5 | 6990 | 8203 | 8624 |
| 6 | 1415 | 1700 | 1995 |
| 7 | 6337 | 7350 | 8500 |
| 8 | 6050 | 6075 | 6445 |

As demonstrated by Table II, the compressive strengths of all compositions after 28 days, with the exception of Example 6 which contained glass fibers and latex binder, were between 6000 and 9200 psi. Example 6 had a compression strength less than 2000 psi. Table II thus demonstrates that compression strengths mainly on an order of magnitude of 8000–10,000 psi are obtainable with security concrete compositions of this invention employing steel fibers. The amount of glass fibers and latex in Example 6 did not provide such high compression strengths in this instance and, therefore, such specific mixtures would not be preferred where high compressive strengths are desired.

The concrete specimens of the Examples 1–8 were then tested with an acetylene torch at temperatures on the order of 3400° F. Diamond core drill and hammer tests were also performed. Table III reports the results of these tests with the figures under the flame removal column being attributable to the volume of material removed with the acetylene torch in milliliters per minute removed from the specimen. The diamond core drill was applied under 50 pounds constant weight with a 2 inch diameter drill. The figures reported in the drill test column are the depth in inches per minute. The hammer test involved a 160 pound drop from 4 feet with a 1 inch bull-nosed chisel, 5 blows at the same location. The figures reported in the hammer test column are the depth of penetration in inches after test.

TABLE III

| Example | Flame Removal (ml./min.) | Drill Test (in./min.) | Hammer Test (depth/in.) |
|---|---|---|---|
| 1 | 21 | 0.49 | 1⅝ |
| 2 | 31 | 0.55 | 1¾ |
| 3 | 27 | 0.42 | 1⅝ |
| 4 | 8 | 0.16 | 2¾ |
| 5 | 17 | 0.30 | Chisel point broke after 3 blows. Blow #2 was 1 5/16 |
| 6 | 5 | 2.33 | 3½ |
| 7 | 19 | 0.32 | 2 |

TABLE III-continued

| Example | Flame Removal (ml./min.) | Drill Test (in./min.) | Hammer Test (depth/in.) |
|---|---|---|---|
| 8 | 7 | 0.30 | 2⅝ |

As demonstrated by Table III the security concrete compositions of this invention demonstrated superior torch resistance within the range of about 5 ml./min. to about 31 ml./min. In comparison, known security concrete mixtures using ordinary portland cement binder and aggregates are not capable of comparably withstanding such acetylene torch. Rather, known security concretes spall, disintegrate and tend to be explosively removed thereby facilitating penetration into the concrete. For example, an acetylene torch under similar conditions would act on a standard portland cement concrete on an order of magnitude of about 3 to about 8 times as fast. Table III also indicates that whereas the flame removal of Example 6 was on a lower order of magnitude, the diamond core drill in the absence of steel fibers facilitated the removal of a larger amount of material from the concrete specimen. Furthermore, Exammple 6 without the steel fibers did not perform as well as examples with steel fibers in a hammer test. Accordingly, in order to achieve the full spectrum of advantages according to the principles of this invention, the concrete structure should include a temperature resistant aggregate, expansive cement, and reinforcing filaments, desirably metal reinforcing filaments. When steel or metal fibers are used, the expansive cement Type K will provide shrinkage-compensation and self-stressing of the concrete mass; thus, very advantageous compressive strengths are achieved. Also, the shrinkage-compensation provides a form-fitting composite of cement and steel casing or other supporting materials.

For the purpose of demonstrating the preferred selection of a non-moisture sorptive refractory aggregate in the concrete of this invention, several concrete test specimens were prepared employing mixtures similar to Examples 1-8, but utilizing two different types of sand. In one set of specimens, the sand was the preferred silica sand of the Ottawa type mentioned above, and in other specimens, river or natural sand was used. The specimens were about 12 inches by 12 inches by 6 inches in thickness. An acetylene torch test was then conducted. The specimens containing the river sand tended to spall and disintegrate, but yet at a slow rate compared to known standard concrete. In contrast, no spalling or disintegration was observed with the silica sand. Therefore, a silica sand of a non-moisture sorptive character is especially critical to completely avoid spalling or disintegration. It was found that the moisture in the river sand caused the specimen to flake. This was concluded after a second specimen containing river sand was dried for three days at 150° F. prior to torch testing. The specimen did not explode and there was very little flaking. Accordingly, the residual moisture may become trapped in the sorptive, porous river sand particles in the concrete mix which may then cause or tend to cause flaking and disintegration of the concrete mass upon high temperature exposure. Therefore, in accordance with the most preferred principles of this invention, non-moisture sorptive aggregate is employed in order to completely avoid disintegration of the concrete.

It will be understood that modifications of this invention in view of the above description and examples may be made without departing from the spirit and scope thereof.

What is claimed is:

1. A safe or vault structure including a self-stressed cured concrete having enhanced resistance to attack by burglar means including torch resistance without flaking, spalling or exploding and resistance to attack by hammers, chisels, drills and cutting implements, derived from a moldable uniform mixture comprising
   about 120 to about 190 parts silica sand aggregates,
   about 40 to about 65 parts metal fibers for torch-tip destruction and reinforcement of said cured concrete,
   about 80 to about 175 parts expansive cement containing a portland cement and an expansive component in an amount at least sufficient to compensate for the shrinkage of said portland cement and to impart expansive and self-stressed properties to the portland cement when said component is hydrated upon curing, and
   about 30 to about 75 parts water to provide a workable moldable mixture, said mixture of ingredients having a slump of about 5.5 to about 6.5 inches and wherein said cured concrete provides said enhanced resistance to attack by said burglar means.

2. The structure of claim 1 wherein said concrete has compressive strengths on the order of about 8000 to about 11,000 psi.

3. The structure of claim 1 wherein said expansive cement is Type K expansive cement and said fibers are steel fibers on the order of about ½ to about 1½ inches in length and having a diameter of at most about 0.3 inch.

4. The concrete of claim 1 wherein said expansive component is anhydrous calcium sulfoaluminate.

5. The structure of claim 1 wherein said structure comprises a pre-formed wall having a cavity and said concrete contained in said cavity to form a composite structure with said wall.

6. The structure of claim 5 wherein said wall comprises a metal casing.

7. A method of making a safe or vault concrete structure having enhanced resistance to attack by burglar means including torch resistance without flaking, spalling or exploding and resistance to attack by hammers, chisels, drills and cutting implements, which comprises
   mixing about 120 to about 190 parts silica sand aggregates, about 40 to about 65 parts reinforcing metal filaments for torch-tip destruction and reinforcement of said concrete structure, about 80 to about 175 parts expansive cement and about 30 to about 75 parts water to provide a workable moldable mixture, said mixture of ingredients having a slump of about 5.5 to about 6.5 inches,
   casting said mixture into a container, and
   curing said mixture in said container to form said concrete structure having said enhanced resistance to attack by said burglar means.

8. The method of claim 7 wherein said container is a metal casing and the cured concrete is self-stressed in said casing to form a composite therewith.

9. A vault or safe door comprising a metal casing and a liner for said casing comprising a cured concrete resistant to attack by heat and implements including torch resistance without flaking, spalling or exploding and resistance to attack by hammers, chisels, drills and cutting implements derived from a moldable aqueous composition containing
   about 120 to about 190 parts silica sand aggregates, about 40 to about 65 parts metal fibers for torch-tip destruction and reinforcement of said cured concrete, about 80 to about 175 parts expansive cement containing a portland cement and an expansive component in an amount at least sufficient to compensate for the shrinkage of said portland cement and to impart expansive and self-stressed properties to the portland cement when said component is hydrated upon curing, and about 30 to about 75 parts water to provide a workable moldable mixture, said mixture of ingredients having a slump of about 5.5 to about 6.5 inches and wherein said cured concrete provides said enhanced resistance to attack by said burglar means.

10. The door of claim 9 wherein said sand has a sieve analysis of no more than about 15% remaining on a 20 mesh screen and no more than about 5% passing a 30 mesh screen, said metal fibers are steel fibers on the order of about ½ to about 1½ inches in length and having a diameter at the most about 0.3 inch, and said expansive cement component is a Type K expansive cement component.

11. A door or wall for a vault or safe comprising a body of cured concrete resistant to attack by heat and implements including torch resistance without flaking, spalling or exploding and resistance to attack by hammers, chisels, drills and cutting implements, derived from a moldable aqueous composition containing silica sand aggregates having a sieve analysis of no more than about 15% remaining on a 20 mesh screen and no more than 5% passing a 30 mesh screen, steel fibers for torch-tip destruction and reinforcement of said cured concrete on the order of about ½ to about 1½ inches in length and having a diameter at the most about 0.3 inch and a Type K expansive cement component, said ingredients proportioned in amounts on the order of about 120 to 190 parts sand, about 40 to about 65 parts metal fibers, about 80 to about 175 parts Type K expansive cement and about 30 to about 75 parts water, said mixture of ingredients having a slump of about 5.5 to about 6.5 inches and wherein said cured concrete provides said enhanced resistance to attack by said burglar means.

* * * * *